(12) United States Patent
Broach

(10) Patent No.: US 6,934,779 B1
(45) Date of Patent: Aug. 23, 2005

(54) ANALOG SIGNAL INTERFACE FOR DIGITAL CONTROL

(75) Inventor: Michael Eugene Broach, San Mateo, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 107 days.

(21) Appl. No.: 10/420,996

(22) Filed: Apr. 21, 2003

(51) Int. Cl.[7] .............................................. G06F 13/12
(52) U.S. Cl. ....................................... 710/69; 341/155
(58) Field of Search .......................... 710/69; 341/155, 341/156, 144

(56) References Cited

U.S. PATENT DOCUMENTS

| | | | | |
|---|---|---|---|---|
| 4,251,804 A | * | 2/1981 | Scardina et al. | 341/122 |
| 5,703,587 A | * | 12/1997 | Clark et al. | 341/144 |
| 5,990,815 A | * | 11/1999 | Linder et al. | 341/131 |
| 6,072,415 A | * | 6/2000 | Cheng | 341/144 |
| 6,144,326 A | * | 11/2000 | Krone et al. | 341/118 |
| 6,411,237 B1 | * | 6/2002 | Lautzenhiser | 341/144 |
| 6,459,394 B1 | * | 10/2002 | Nadi et al. | 341/120 |
| 6,535,156 B1 | * | 3/2003 | Wang et al. | 341/156 |
| 6,791,484 B1 | * | 9/2004 | Lee et al. | 341/118 |

* cited by examiner

*Primary Examiner*—Jeffrey Gaffin
*Assistant Examiner*—Harold Kim
(74) *Attorney, Agent, or Firm*—Brett A. Hertzberg; Merchant & Gould P.C.

(57) ABSTRACT

An integrated circuit is configured to receive encoded digital data from a system controller over a single signal line. The system controller encodes the digital data into a singular analog quantity such as a voltage, a current, a sine wave frequency, a sine wave amplitude, a pulse train frequency, or a pulse train duty cycle. The encoded digital data is transmitted to the signal line. The integrated circuit decodes the digital data from the signal line. The decoded digital data is employed by the integrated circuit to adjust one or more parameters of the integrated circuit. In one example, one or more parameters may be adjusted to select various operating modes for the integrated circuit. The singular analog quantity encoding/decoding methodology may be extended to more than one signal line when desirable.

21 Claims, 6 Drawing Sheets

ANALOG SIGNAL INTERFACE FOR DIGITAL CONTROL

FIELD OF THE INVENTION

The present invention is related to a method of controlling one or more parameters within an integrated circuit. More particularly, the present invention is related to an analog signal interface in the integrated circuit that utilizes a single pin interface.

BACKGROUND OF THE INVENTION

Demand for portable electronic devices is increasing each year. Example portable electronic devices include: laptop computers, personal data assistants (PDAs), cellular telephones, and electronic pagers. Portable electronic devices place high importance on total weight and size of the device.

The demand for higher speed circuits with smaller form factors is increasing, largely as a result of increases in the need for portable electronic devices. The density of circuits (board level, hybrid, and/or integrated circuit) is increasing as a consequence of the need for smaller form factors in the portable devices. The increased density of the circuits results in special requirements for packaging and heat dissipation.

In some instances, an external interface to the IC is required for configuration and/or control. A typical IC interface includes a parallel bus that uses several pins. In a parallel bus solution, each pin corresponds to a different bit of a digital control word. Another typical IC interface includes a serial bus that uses two pins. In a serial bus solution, one pin corresponds to a clock signal, while the other pin corresponds to the serial bit stream that provides the control word to the IC for configuration and/or control. Serial pin interfaces often result in considerably more circuitry when compared to a parallel interface. The additional circuitry in the serial pin interface consumes additional "die-area" in the IC, which may increase risk and failure rates of the interface.

Portable applications may require special small form factors that adversely impact the number of available pins in the packaging for an external interface. In integrated circuit components (ICs), bonding pads are required on the die for connection to the external pin. Often times, the bonding pads on the die take up a substantial amount of area on the die such that the die area is said to be "pad limited". Modern technologies such as micro-SMD, and flip-chip suffer from pad limited die areas such that the number of available pins are a determining factor for the total area of the die, and hence a dominant factor in cost. The reduced available die area may adversely impact the number of available pins for the external control interface.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Figure 1A:
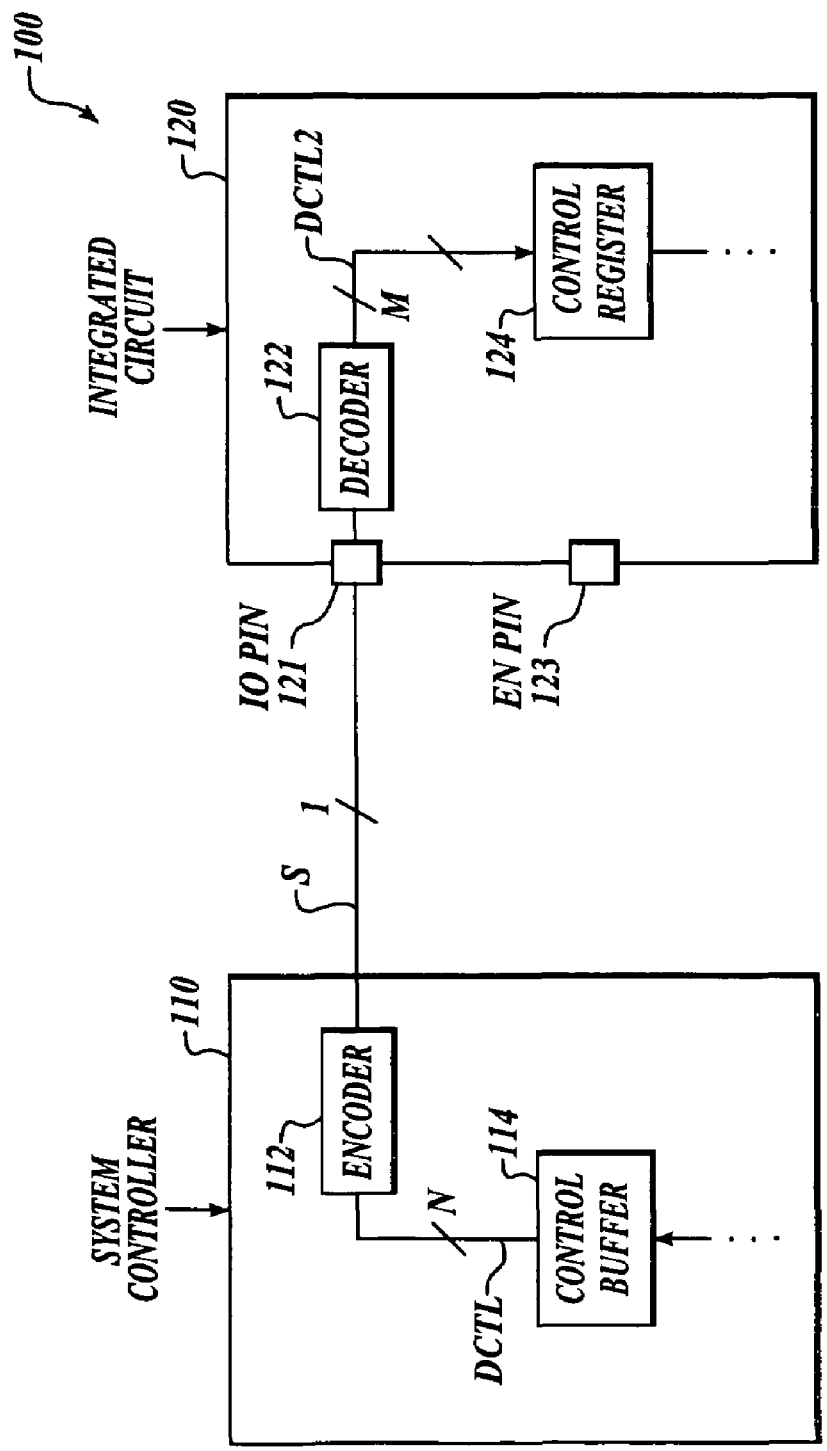
FIG. 1A is an illustration of a system diagram for an embodiment of the present invention.

Throughout the specification and claims, the following terms take the meanings explicitly associated herein, unless the context clearly dictates otherwise. The meaning of "a," "an," and "the" includes plural reference. The meaning of "in" includes "in" and "on." The term "connected" means a direct connection between the items connected, without any intermediate devices. The term "coupled" refers to both direct connections between the items connected, and indirect connections through one or more intermediary items. The term "circuit" may refer to both single components, and to a multiplicity of components. The term component refers to one or more items that are configured to provide a desired function. The term "signal" includes signals such as currents, voltages, charges, logic signals, data signals, optical signals, electromagnetic waves, as well as others. Referring to the drawings, like numbers indicate like parts throughout the views.

Briefly stated, the present invention is related to an integrated circuit that is configured to receive encoded digital data from a system controller over a single signal line. The system controller encodes the digital data into a singular analog quantity such as a voltage, a current, a sine wave frequency, a sine wave amplitude, a pulse train frequency, or a pulse train duty cycle. The encoded digital data is transmitted to the signal line. The integrated circuit decodes the digital data from the signal line. The decoded digital data is employed by the integrated circuit to adjust one or more parameters of the integrated circuit. In one example, one or more parameters may be adjusted to select various operating modes for the integrated circuit. The singular analog quantity encoding/decoding methodology may be extended to more than one signal line when desirable.

The number of pins that are required in the integrated circuit is reduced by encoding the multi-bit digital quantity into a singular analog quantity. Conventional digital signal interfaces require a minimum of two interface pins. For example, a typical parallel digital signal interfaces require a pin for every bit of the digital quantity, while a typical serial digital signal interface requires a pin for the clock signal and the serial data signal. In many instances, the integrated circuit die area is pad-limited so that additional pins will greatly increase the unit cost of each integrated circuit. Moreover, the increased pin count will increase the packaging cost of the integrated circuit.

FIG. 1A is an illustration of a system diagram for an embodiment of the present invention. As shown in FIG. 1A, a system controller (110) is configured to communicate with an integrated circuit (120) over a signal line (e.g., a single wire interface). The system controller (110) includes an encoder (112) that is arranged to encode a multi-bit digital quantity (DCTL) into a singular analog quantity (S). The multi-bit (e.g., N-bit) quantity (DCTL) may be provided by a control buffer (114) within the system controller (110). The integrated circuit (120) includes an IO pin (121) that is coupled to a decoder (122), which is configured to convert the singular quantity (S) to another multi-bit digital quantity (DCTL2). The decoded multi-bit digital quantity (DCTL2) may be provided to a memory such as a control register (124). The control register (124) may provide various control signals to other circuits within the integrated circuit (120).

Figure 1B:
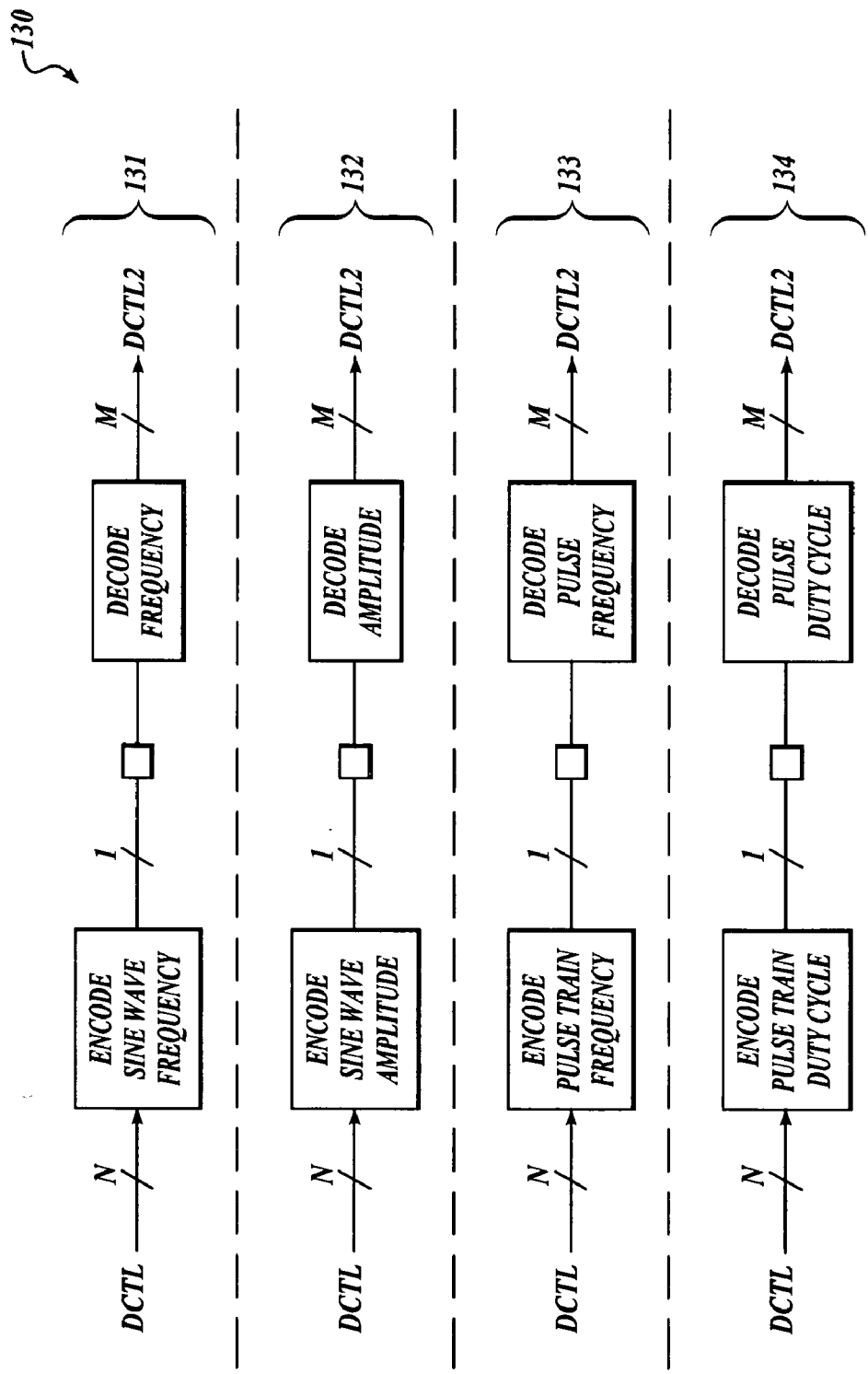
FIG. 1B is an illustration of additional system diagrams of additional embodiments of the present invention.

The singular analog quantity may be encoded into any appropriate analog quantity. Non-limiting example analog quantities include: voltage, current, sine wave frequency, sine wave amplitude, pulse train frequency, pulse train amplitude, and pulse train duty cycle. The encoder (112) in the system controller (110) is paired with the decoder in the integrated circuit such that appropriate encoding and decoding may be accomplished. FIG. 1B is an illustration of additional system diagrams (130) of additional embodiments of the present invention (131–134). Each of the additional embodiments illustrate that the encoder and decoder form a complementary pair.

Figure 2:
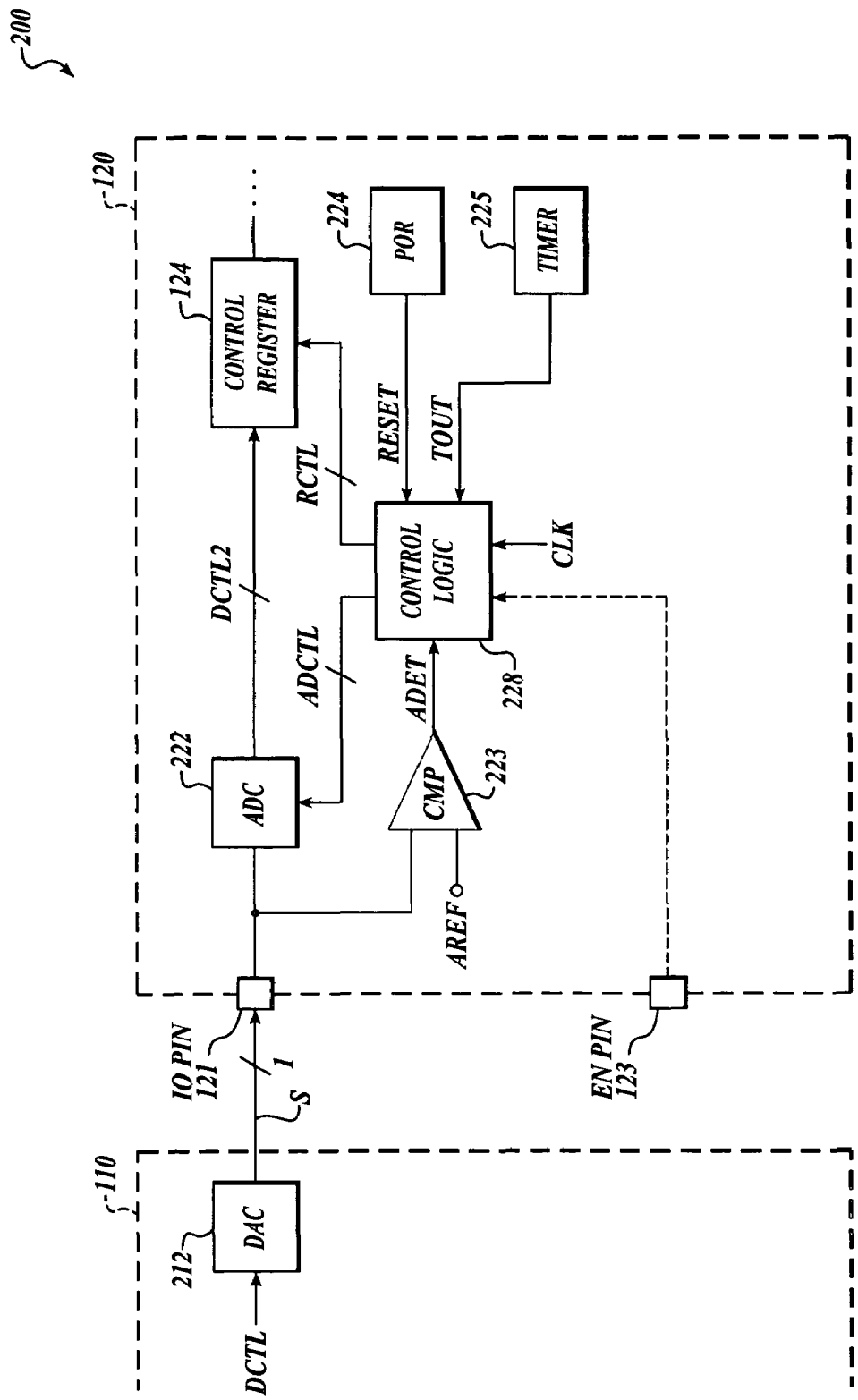
FIG. 2 is an illustration of a schematic diagram of an integrated circuit that is arranged according to an embodiment of the present invention.

FIG. 2 is an illustration of a schematic diagram (200) of an integrated circuit that is arranged according to an embodiment of the present invention. As shown in the figure, the system controller (110) includes a digital-to-analog converter (DAC, 212) that converts the multi-bit digital quantity (DCTL) to an analog signal (S). The analog signal (S) is received by the integrated circuit (120) via 10 pin 121. The integrated circuit (120) includes an analog-to-digital converter (ADC, 222) that converts the analog signal (S) into a multi-bit digital quantity (DCTL2), which may be stored in a memory such as a control register (124). A control logic block (228) is arranged to provide various control signals to ADC 222 (e.g., ADCLK) and control register 124 (e.g., LATCH).

Integrated circuit 120 may be configured to selectively retrieve the decoded digital quantity (DCTL2) in response to a number of events. One example event may be triggered by an analog detection signal (ADET), where a comparator (CMP 223) detects when IO pin 121 crosses a threshold that is set by an analog reference level (AREF). Another example event may be triggered by a reset condition that is asserted by a power on reset circuit (POR 224). Still another example event may be triggered by a timeout condition (TOUT) that is asserted by a timer (225). Yet another example event may be triggered by the toggling of a signal associated with another pin such as an enable pin (ENPIN 123). The example triggering events listed above are not exhaustive, and additional triggering events may be provided to or within control logic 228.

Figure 3:
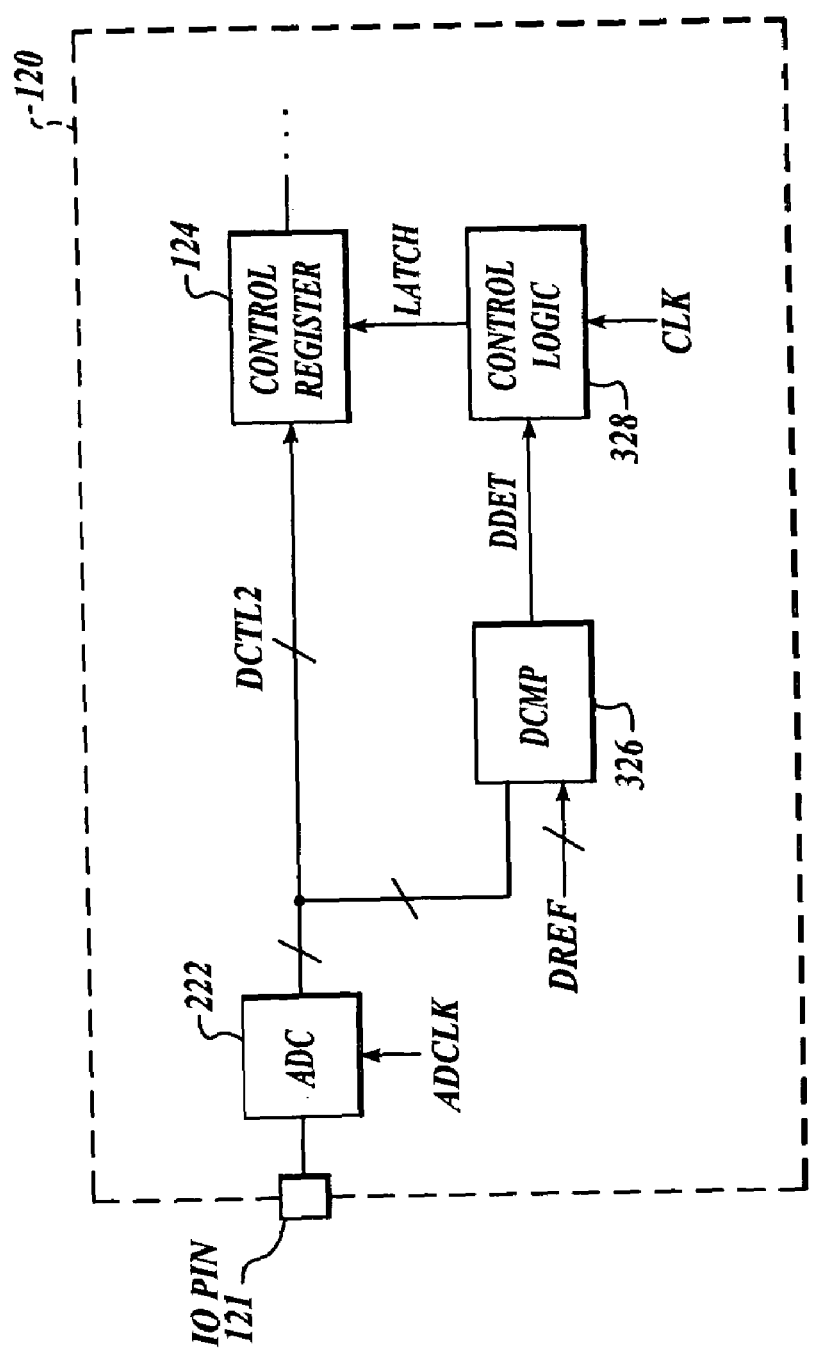
FIG. 3 is an illustration of another schematic diagram of an integrated circuit that is arranged according to another embodiment of the present invention.

FIG. 3 is an illustration of another schematic diagram of an integrated circuit that is arranged according to another embodiment of the present invention. As shown in FIG. 3, a digital comparator (DCMP 326) is arranged to provide a digital detection signal (DDET) to a control logic block (328). The digital comparator (326) is arranged to evaluate the output of an ADC (222), and provide the digital detection signal (DDET) when the decoded digital quantity (DCTL2) matches a digital reference signal (DREF). Subsequently, control logic 328 is arranged to provide a latch signal (LATCH) to a control register (124) such that the control information that follows the reference signal is stored in the register. For this example, system controller 110 is further arranged to transmit an encoded digital reference signal followed by the control signal. Control logic block 328 is illustrated as responsive to a clock signal (CLK), while ADC 222 is operated from a separate clock signal (ADCLK). In one example, clock signal CLK is operated independently from clock signal ADCLK. In another example, clock signals CLK and ADCLK are related to one another.

Figure 4:
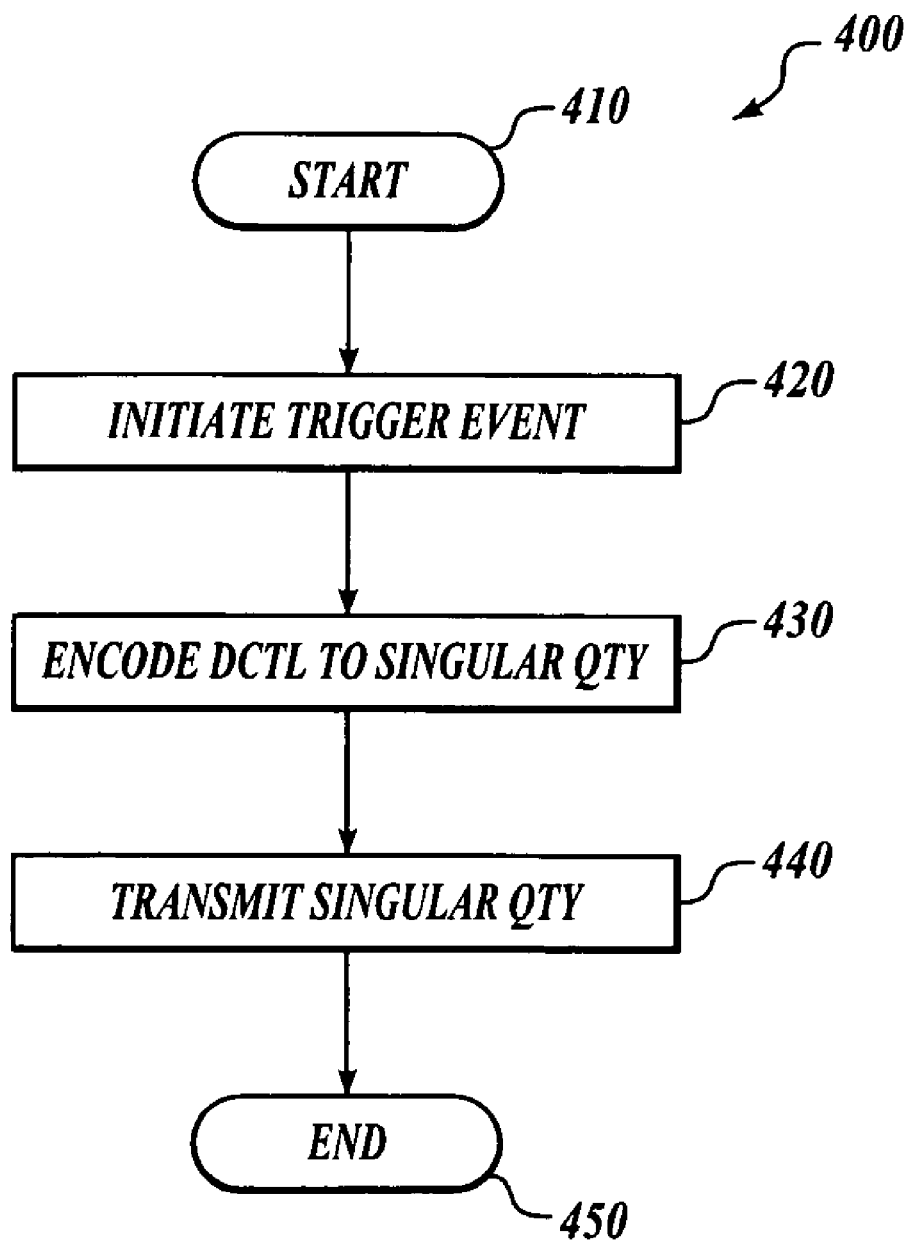
FIG. 4 is an illustration of a process flow for still another embodiment of the present invention.

FIG. 4 is an illustration of a process flow of yet another embodiment of the present invention. The process flow illustrated in FIG. 4 is for an example system controller. Processing flows from start block 410 to block 420. At block 420, the system controller initiates a trigger event. Processing continues to block 430 where the system control encodes the multi-bit digital quantity into a singular analog quantity. Proceeding to block 440, the singular analog quantity is transmitted to the integrated circuit. Processing ends at block 450.

Block 420 is an optional block that may not be required depending on the integrated circuit implementation. In a first example, the trigger event is unrelated to the system controller and is related to some other condition such as the detection of a power-on-reset (POR) or a timeout condition. For the first example, block 420 is unnecessary and may be eliminated. In a second example, the trigger event includes the detection of a specific analog voltage or current (or within a prescribed range) by the integrated circuit. For the second example, block 420 includes asserting the specified analog voltage or current for a predetermined time interval. In a third example, the trigger event may include the detection of a specific multi-bit digital quantity. For the third example, block 420 includes encoding the specific multi-bit quantity to a singular quantity and transmitting the singular quantity to the integrated circuit. In a fourth example, the trigger event includes the detection of the toggling of a specified pin (e.g., EN) on the integrated circuit. For the fourth example, block 420 includes toggling the specified pin over a predetermined time interval. Additional trigger events are contemplated such that each integrated circuit implementation has an appropriate trigger event.

Figure 5:
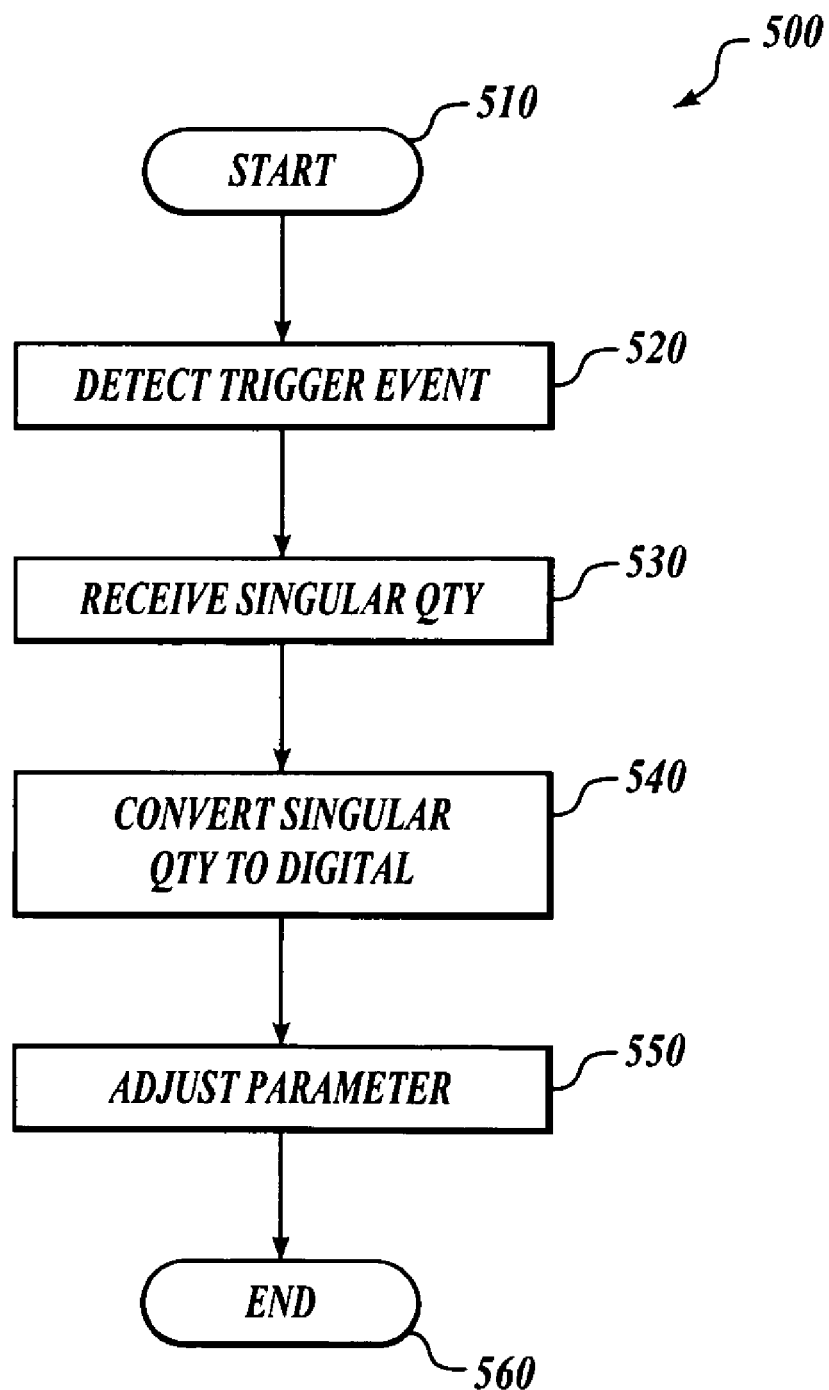
FIG. 5 is an illustration of a process flow of yet another embodiment of the present invention.

FIG. 5 is an illustration of a process flow of yet another embodiment of the present invention. The process flow illustrated in FIG. 5 is for an example integrated circuit. Processing flows from start block 510 to block 520. At block 520, the integrated circuit detects a trigger event. Processing continues to block 530 where the integrated circuit receives the analog signal that corresponds to a singular quantity. Continuing to block 540, the integrated circuit decodes the multi-bit digital quantity from the analog signal. Proceeding to block 550, the decoded digital signal is provided to additional circuitry for parameter adjustment in the integrated circuit. Processing ends at block 560.

Block 520 may vary between integrated circuit implementations depending on the selected triggering mechanism. In a first example, the trigger event is unrelated to the system controller and is related to some other condition such as the detection of a power-on-reset (POR) or a timeout condition (TOUT). In a second example, the trigger event includes the detection of a specific analog voltage or current (or within a prescribed range) by the integrated circuit (e.g., ADET>AREF). In a third example, the trigger event may include the detection of a specific multi-bit digital quantity (e.g., DCTL2=DREF). In a fourth example, the trigger event includes the detection of the toggling of a specified pin (e.g., EN) on the integrated circuit. Additional trigger events are contemplated such that each integrated circuit implementation has an appropriate trigger event. In a fifth example, the trigger event includes the detection of a voltage associated with a pin exceeding a predetermined voltage such as exceeding the high supply voltage or dropping below the low supply voltage.

The above specification provides a complete description of the manufacture and use of the composition of the invention. Since many embodiments of the invention can be made without departing from the spirit and scope of the invention, the invention resides in the claims hereinafter appended.

I claim:

1. An apparatus for communicating between a system controller and an integrated circuit such that at least one parameter in the integrated circuit is adjusted, comprising: a decoder that is arranged to receive a singular analog quantity via a single line interface, wherein the decoder is configured to provide a decoded multi-bit digital quantity in response to the singular analog quantity, wherein the decoder is part of the integrated circuit, and wherein the decoded multi-bit digital quantity is employed by a sub-circuit of the integrated circuit other than the decoder to adjust the at least one parameter associated with the integrated circuit.

2. The apparatus of claim 1, further comprising: a control register that is coupled to the decoder, wherein the control register is arranged to store the decoded multi-bit digital quantity.

3. The apparatus of claim 1, the decoder further comprising: an analog-to-digital converter that is arranged to provide the decoded multi-bit quantity in response to the singular analog quantity, wherein the singular analog quantity corresponds to at least one of a voltage and a current.

4. The apparatus of claim 1, the decoder further comprising: a sine wave decoder that is arranged to provide the decoded multi-bit digital quantity in response to the singular analog quantity, wherein the singular analog quantity is a sine wave signal that has at least one of a frequency and an amplitude that corresponds to the encoded multi-bit digital quantity.

5. The apparatus of claim 1, the decoder further comprising: a pulse train decoder that is arranged to provide the multi-bit digital quantity in response to the singular analog quantity, wherein the singular analog quantity is a pulse train that has at least one of a frequency, an amplitude, and a duty-cycle that corresponds to the encoded multi-bit digital quantity.

6. The apparatus of claim 1, further comprising: an encoder that is configured to encode a multi-bit digital quantity as the singular analog quantity, wherein the encoder is part of the system controller, and wherein the encoder is arranged to couple the singular analog quantity to the single line interface.

7. The system of claim 6, the encoder further comprising: a digital-to-analog converter that is arranged to provide the singular analog quantity in response to the multi-bit digital quantity, wherein the singular analog quantity corresponds to at least one of a voltage and a current.

8. The system of claim 6, the encoder further comprising: a sine wave encoder that is arranged to provide the singular analog quantity in response to the multi-bit digital quantity, wherein the singular analog quantity is a sine wave signal that has at least one of a frequency and an amplitude that corresponds to the encoded multi-bit digital quantity.

9. The system of claim 6, the encoder further comprising: a pulse train encoder that is arranged to provide the singular analog quantity in response to the multi-bit digital quantity, wherein the singular analog quantity is a pulse train that has at least one of a frequency and a duty-cycle that corresponds to the encoded multi-bit digital quantity.

10. The apparatus of claim 1, further comprising: a control logic that is located within the integrated circuit, wherein the control logic is arranged to selectively adjust the at least one parameter after a triggering event is detected.

11. The system of claim 10, father comprising: an analog comparator that is coupled to the single line interface, wherein the analog comparator is arranged to assert an analog detect signal when the singular analog quantity corresponds to a predetermined level, and wherein the control logic is arranged to detect the triggering event when the analog detect signal is asserted.

12. The system of claim 10, further comprising: a digital comparator that is arranged to receive the decoded multi-bit digital quantity, wherein the digital comparator is arranged to assert a digital detect signal when the decoded multi-bit quantity corresponds to a predetermined value, and wherein the control logic is arranged to detect the triggering event when the digital detect signal is asserted.

13. The system of claim 10, wherein the control logic is arranged to detect the triggering event in response to at least one of a power-on-reset signal, a timeout signal, a first signal level associated with the single line interface that is above a high power supply level, a second signal level associated with the single line interface that is below a low power supply level, a changing signal from another single line interface, a third signal level associated with other single line interface that exceeds the high power supply level, and a fourth signal level associated with another single line interface that is below the low power supply level.

14. An apparatus for communicating between a system controller and an integrated circuit such that at least one parameter in the integrated circuit is adjusted, comprising: an encoder that is arranged to encode a multi-bit digital quantity as a singular analog quantity, wherein the encoder is part of the system controller, and wherein the encoder is arranged to couple the singular analog quantity to the single line interface such that the singular analog quantity is subsequently decoded by a sub-circuit of the integrated circuit and the decoded multi-bit digital quantity is employed by another sub-circuit of the integrated circuit to adjust the at least one parameter associated with the integrated circuit.

15. A method for changing at least one parameter in an integrated circuit, comprising:
   detecting a triggering event;
   receiving a singular analog quantity from a single line interface;
   converting the singular analog quantity into a decoded multi-bit digital quantity in a decoding circuit of the integrated circuit; and
   adjusting the at least one parameter in response to the decoded multi-bit digital quantity in a circuit of the integrated circuit other than the decoding circuit after the triggering even is detected.

16. The method of claim 15, wherein detecting the triggering event comprises at least one of: detecting a power-on-reset condition, detecting a timeout signal, detecting a first signal level associated with the single line interface that is above a high power supply level, detecting a second signal level associated with the single line interface that is below a low power supply level, detecting a changing signal from another single line interface, detecting a third signal level associated with other single line interface that exceeds the high power supply level, detecting a fourth signal level associated with another single line interface that is below the low power supply level, detecting a predetermined value for the decoded multi-bit quantity, and detecting a predetermined value for the singular analog quantity.

17. The method of claim 15, wherein converting the singular analog quantity comprises at least one of: converting a voltage to the decoded multi-bit digital quantity, converting a current to the decoded multi-bit digital quantity, converting a sine wave frequency to the decoded multi-bit digital quantity, converting a sine wave amplitude to the decoded multi-bit value, convening a pulse-train frequency to the decoded multi-bit value, converting a pulse-train amplitude to the decoded multi-bit value, and converting a pulse-train duty-cycle to the decoded multi-bit value.

18. A method for initiating at least one parameter change in an integrated circuit, comprising:
  encoding a multi-bit digital quantity as a singular analog quantity; and
  transmitting the singular analog quantity over a single line interface, wherein the integrated circuit is capable of:
    decoding the singular analog quantity in a decoding circuit of the integrated circuit; and
    changing the at least one parameter in a circuit of the integrated circuit other than the decoding circuit in response to the singular analog quantity.

19. The method of claim 18, wherein encoding the multi-bit digital quantity comprises at least one of: converting the multi-bit digital quantity to a voltage, converting the multi-bit digital quantity to a current, converting the multi-bit digital quantity to a sine wave with a specific frequency, converting the multi-bit digital quantity to a sine wave with a specific amplitude, converting the multi-bit digital quantity to a pulse-train with a specific frequency, and converting the multi-bit digital quantity to a pulse-train with a specific duty-cycle.

20. The method of claim 18, further comprising: initiating a triggering event, wherein the triggering event includes at least one of: driving the single line interface above a high power supply level for the integrated circuit, driving the single line interface with a predetermined value, driving the signal line interface below a low power supply level for the integrated circuit, changing another signal from another single line interface in a predetermined fashion, driving the other single line interface above the high power supply level, driving the other single line interface below the low power supply level.

21. An apparatus for communicating between a system controller and an integrated circuit such that at least one parameter associated with an operating mode of the integrated circuit is adjusted, the apparatus comprising:
  a decoder of the integrated circuit that is arranged to receive a singular analog quantity via a single line interface, wherein the decoder is configured to provide a decoded multi-bit digital quantity in response to the singular analog quantity; and
  a sub-circuit of the integrated circuit other than the decoder, wherein the sub-circuit is arranged to employ the decoded multi-bit digital quantity to adjust the at least one parameter associated with an operating mode of the integrated circuit.

* * * * *

UNITED STATES PATENT AND TRADEMARK OFFICE
CERTIFICATE OF CORRECTION

PATENT NO. : 6,934,779 B1
DATED : August 23, 2005
INVENTOR(S) : Michael Eugene Broach It is certified that error appears in the above-identified patent and that said Letters Patent is hereby corrected as shown below:

<u>Column 3,</u>
Line 25, "via 10 pin 121." should read -- via IO pin 121. --.

<u>Column 6,</u>
Line 20, "with other signal" should read -- with another signal" --.
Line 48, "the triggering even" should read -- the triggering event --.
Line 57, "with other signal" should read -- with another signal --.

Signed and Sealed this

Eleventh Day of April, 2006

JON W. DUDAS
*Director of the United States Patent and Trademark Office*